(12) United States Patent
Montena et al.

(10) Patent No.: US 10,768,389 B2
(45) Date of Patent: Sep. 8, 2020

(54) FLEXIBLE FIBER NODE CONNECTOR

(71) Applicant: PPC BROADBAND, INC., East Syracuse, NY (US)

(72) Inventors: Noah P. Montena, Syracuse, NY (US); William Crawford, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/364,170

(22) Filed: Mar. 25, 2019

(65) Prior Publication Data
US 2019/0293893 A1    Sep. 26, 2019

Related U.S. Application Data

(60) Provisional application No. 62/646,988, filed on Mar. 23, 2018.

(51) Int. Cl.
G02B 6/44    (2006.01)

(52) U.S. Cl.
CPC ......... *G02B 6/4478* (2013.01); *G02B 6/4472* (2013.01)

(58) Field of Classification Search
None
See application file for complete search history.

(56) References Cited

U.S. PATENT DOCUMENTS

| | | | |
|---|---|---|---|
| 5,179,617 A | 1/1993 | Stockman | |
| 5,416,874 A * | 5/1995 | Giebel | G02B 6/3897 174/23 R |
| 6,738,555 B1 * | 5/2004 | Cooke | G02B 6/4471 385/136 |
| 7,934,954 B1 | 5/2011 | Chawgo et al. | |
| 8,707,950 B1 * | 4/2014 | Rubin | A61M 16/06 128/202.27 |
| 9,057,845 B2 * | 6/2015 | Szilagyi | B29D 11/0075 |
| 2004/0121646 A1 * | 6/2004 | Iamartino | G02B 6/3829 439/445 |
| 2006/0193562 A1 | 8/2006 | Theuerkorn | |
| 2008/0175541 A1 * | 7/2008 | Lu | G02B 6/3816 385/62 |
| 2009/0060421 A1 * | 3/2009 | Parikh | G02B 6/4442 385/71 |
| 2013/0343706 A1 * | 12/2013 | Droesbeke | G02B 6/4478 385/76 |
| 2014/0041212 A1 * | 2/2014 | Penumatcha | H01R 13/562 29/748 |
| 2014/0133823 A1 * | 5/2014 | Simmons | G02B 6/4248 385/137 |
| 2016/0266326 A1 | 9/2016 | Gniadek | |

OTHER PUBLICATIONS

Jun. 5, 2019 International Search Report issued in International Application No. PCT/US2019/023949.

* cited by examiner

*Primary Examiner* — Michael Stahl
(74) *Attorney, Agent, or Firm* — MH2 Technology Law Group, LLP

(57) ABSTRACT

A connector includes a connector body and a tubular member. The connector body includes a first end and a second end such that the connector body forms an inner annular chamber for receiving the cable. The tubular member is connected to the first end of the connector body, and the tubular member bends and flexes relative to the connector body.

18 Claims, 8 Drawing Sheets

US 10,768,389 B2

FLEXIBLE FIBER NODE CONNECTOR

CROSS-REFERENCE TO RELATED APPLICATION

This nonprovisional application claims the benefit of U.S. Provisional Application No. 62/646,988, filed Mar. 23, 2018. The disclosure of the prior application is hereby incorporated by reference herein in its entirety

TECHNICAL FIELD

The present disclosure is directed to a connector for cables and, more particularly, to a flexible connector that allows for connection of a multi-fiber cable with a fiber node.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a number of fiber nodes (i.e., fiber connection points) to which a multi-fiber cable is connected. At a fiber node, the individual optical fibers (e.g. 6, 12, 24, etc. fibers) contained in the multi-fiber cable are broken out of the multi-fiber cable and into a same number of single-fiber cables that are each terminated with an optical fiber connector so as to be coupled with another fiber optic connector at the fiber node.

Connectors are conventionally used to connect a multi-fiber cable with a fiber node. Conventional connectors typically include a hardline connector housing with an open interior for housing the broken out fibers and furcation tubes through which the fibers pass to a terminated end with a fiber optic connector. Such conventional connectors only allow for the cables to be connected at a single angle relative to the fiber node. For example, the connector housing may be aligned with (e.g., coaxial with) a receiving opening on the fiber node. Thus, if the opening on the fiber node is arranged horizontally, the multi-fiber cable disposed rearward of where the multi-fiber cable enters the connector may bend downward under the force of gravity. Similarly, if the opening on the fiber node is arranged upward in a vertical direction, the multi-fiber cable disposed rearward of where the multi-fiber cable enters the connector may bend downward under the force of gravity. Such conventional connectors can cause bending or kinking of the fiber, which could result in damage to the cable and loss of optical signal.

Some conventional connectors may include a fixed shape, for example, a shape forming a right angled elbow. Such conventional connectors are not able to bend and move into other shapes or angles. Thus, when installing a cable in such conventional connectors, the fiber strands of the cable must be pushed through and around the right angled elbow of the connectors. This can be difficult to accomplish and such conventional connectors can cause bending or kinking of the fiber, which could result in damage to the cable and loss of optical signal.

The disclosed connector is directed to overcoming one or more of the problems set forth above and/or other problems of the prior art. For example, it may be desirable to provide a flexible fiber node connector that allows freedom of movement of the connector relative to a multi-fiber cable and breakout cables such that a technician can install the connector to a fiber node at any angle without twisting, kinking, or bending the fiber breakout cables that are held within the connector.

SUMMARY

The present disclosure is directed to a connector that includes a connector body with a first end and a second end such that the connector body forms an inner annular chamber for receiving the cable. The connector also includes a flexible duct that is connected to the first end of the connector body. The flexible duct is configured to bend and flex relative to the connector body.

BRIEF DESCRIPTION OF THE DRAWINGS

For a further understanding of the disclosure, reference will be made to the following detailed description of the invention which is to be read in connection with the accompanying drawing and in which like numbers refer to like parts, wherein.

DETAILED DESCRIPTION OF EMBODIMENTS

As a preface to the detailed description, it should be noted that, as used in this specification and the appended claims, the singular forms "a", "an," and "the" include plural referents, unless the context clearly dictates otherwise.

Figure 1:
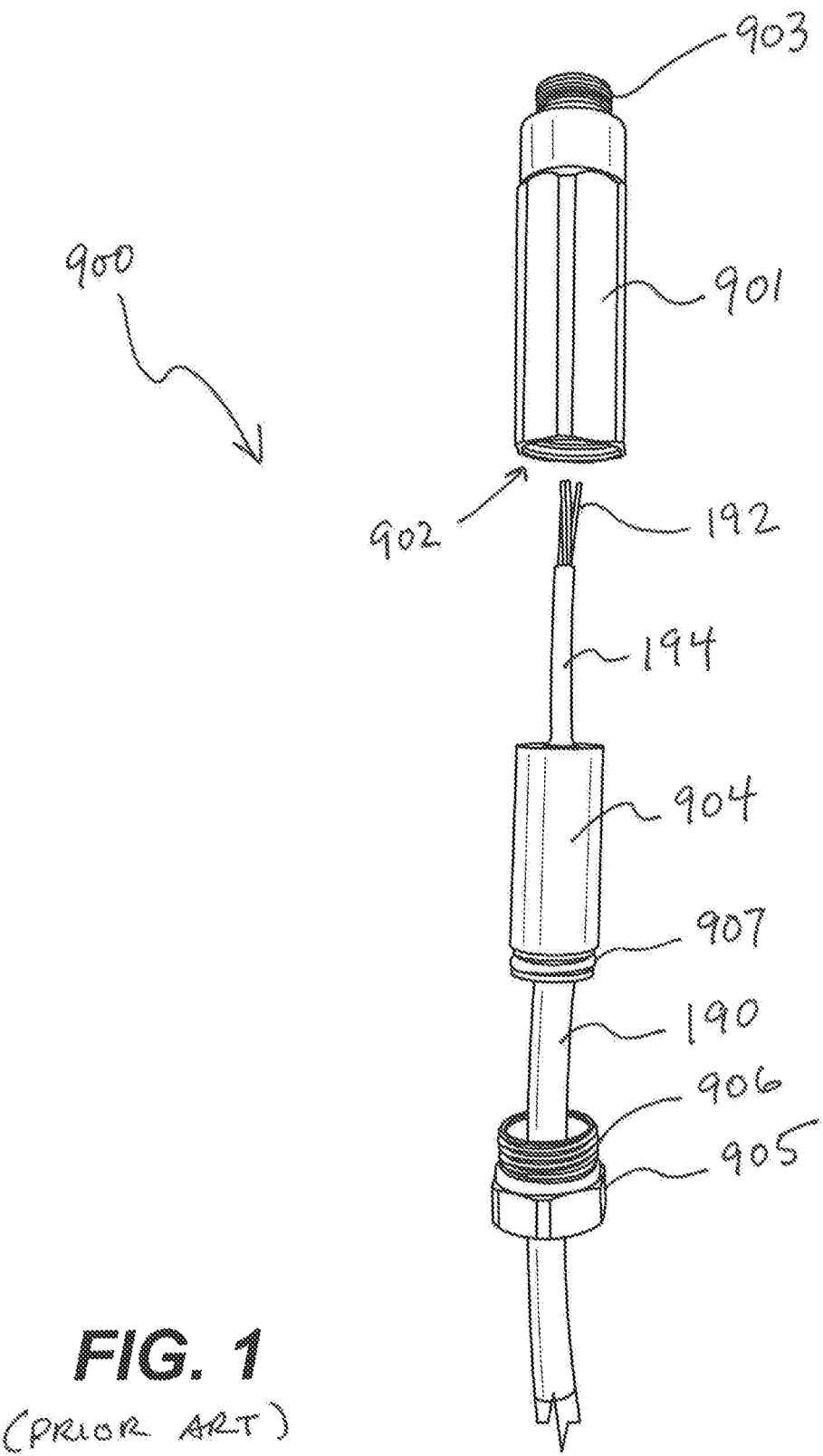
FIG. 1 is an exploded view of a conventional fiber node connector.
Figure 2:
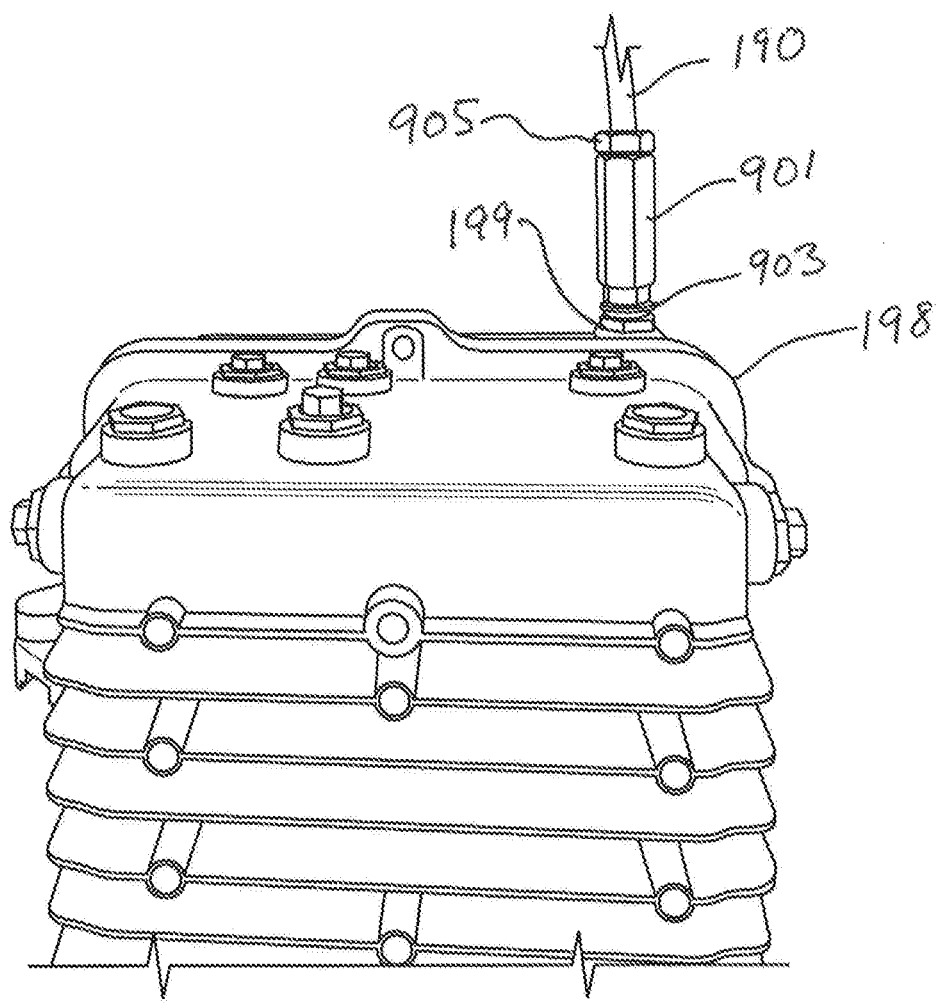
FIG. 2 is a diagrammatic illustration of the conventional fiber node connector of FIG. 1 attached to a fiber node.

FIGS. 1 and 2 illustrate a conventional fiber node connector 900 that connects a multi-fiber cable 190 to a fiber node 198. The fiber node connector 900 includes a body 901 having a female threaded rear end 902 and a male threaded forward end 903, an inner sleeve 904, and a rear nut 905 having a male threaded forward end 906. The rear nut 905 and the inner sleeve 904 receive the multi-fiber cable 190. The individual optical fibers 192 of the multi-fiber cable 190 are broken out from the multi-fiber cable 190 in the inner sleeve 904. A shrink wrap 194 may be used to assist with management of the fibers 192 in the connector 900.

Each of the fibers 192 is inserted through a furcation tubing (not shown), or jacketing, that protects the fibers from damage. An epoxy (not shown) may be used to secure the fibers 192 within the inner sleeve 904. The furcation tubing that contains the fibers 192 is then advanced through the body 901 and out the forward end 903 where the fibers 192 are terminated with a fiber optic connector, such as, for example, an SC connector, an LC connector, an LC duo connector, or the like. The inner sleeve 904 is inserted into the body 901, and the male threaded forward end 906 of the rear nut 905 is threaded into the female threaded rear end 902 of the body 901 to secure the inner sleeve 904 within the body 901 and the rear nut 905. A seal 907, for example, an O-ring, may be disposed between an outer surface of the inner sleeve 904 and an inner surface of the body 901 or the rear nut 905 to provide an environmental seal that prevents foreign matter from entering an inside of the connector 900. As shown in FIG. 2, the male threaded forward end 903 of the body 901 is threadedly coupled with a female threaded port 199 of the fiber node 198 such that the furcation tubing that contains the fibers 192 passes through the port 199 and into an interior of the fiber node 198 such that the terminated fibers 192 can be coupled with an adapter, a splitter, or any other optical fiber connection.

Referring now to FIGS. 3-8, an exemplary connector 100 for connecting a multi-fiber cable 190 to a fiber node 198 is illustrated. The connector 100 includes a connector body 120, a flexible duct 130 (or flexible tubular member), a front nut 160, and a rear nut 180. The connector body 120 is coupled with a first rearward end 132 of the flexible duct 130, and the front nut 160 is coupled with a second forward end 134 of the flexible duct 130 that is opposite to the first rearward end 132. The connector body 120 includes a collar portion 122 at a forward end 124, a threaded opening 126 at a rearward end 128, and an inner bore 129 that extends through the length of the connector body 120 from the rearward end 128 to the forward end 124. The rear nut 180 includes a threaded outer surface 182 at its forward end that is structured and arranged such that the rear nut 180 can be threadedly received by the threaded opening 126 of the connector body 120. The front nut 160 includes a collar portion 162 at a rearward end 164, a threaded outer surface 166 at a forward end 168, and an inner bore 170 that extends through the length of the front nut 160 from the rearward end 164 to the forward end 168. The flexible duct 130 includes a tubular bore 131 extending through the length of the flexible duct 130 from the first rearward end 132 to the second forward end 134.

The connector body 120 is rotatingly coupled relative to the flexible duct 130 by way of a first duct fitting 136 that is coupled with the first end 132 of the flexible duct 130. For example, the first duct fitting 136 may be fixedly coupled with the flexible duct 130 via a press fit or an interference fit such that the first duct fitting 136 is configured to be rotatingly and axially fixed to the flexible duct 130 during normal use of the connector 100. The first duct fitting 136 includes a collar portion 138 and a forward shoulder portion 140 that extends radially outward from the collar portion 138 at the forward end of the first duct fitting 136. The forward shoulder portion 140 extends radially outward beyond a radially inner surface 123 of a forward lip 125 of the collar portion 122 of the connector body 120 such that the forward shoulder portion 140 limits forward axial movement of the connector body 120 relative to the flexible duct 130. The first duct fitting 136 includes a rearward retaining portion 142 that extends radially outward from the collar portion 138. The rearward retaining portion 142 extends radially outward beyond the radially inner surface 123 such that the rearward retaining portion 142 limits rearward axial movement of the connector body 120 relative to the flexible duct 130. Thus, the connector body 120 can rotate relative to the flexible duct 130 and can move axially relative to the flexible duct 130 between the limits imposed by the forward shoulder portion 140 and the rearward retaining portion 142.

Similarly, the front nut 160 is rotatingly coupled relative to the flexible duct 130 by way of a second duct fitting 144 that is coupled with the second end 134 of the flexible duct 130. For example, the second duct fitting 144 may be fixedly coupled with the flexible duct 130 via a press fit or an interference fit such that the second duct fitting 144 is configured to be rotatingly and axially fixed to the flexible duct 130 during normal use of the connector 100. The second duct fitting 144 includes a collar portion 146 and a rearward shoulder portion 148 that extends radially outward from the collar portion 146 at the rearward end of the second duct fitting 144. The rearward shoulder portion 148 extends radially outward beyond a radially inner surface 172 of a forward lip 174 of the collar portion 162 of the front nut 160 such that the rearward shoulder portion 148 limits rearward axial movement of the front nut 160 relative to the flexible duct 130. The second duct fitting 144 includes a forward retaining portion 149 that extends radially outward from the collar portion 146. The forward retaining portion 149 extends radially outward beyond the radially inner surface 172 such that the forward retaining portion 149 limits forward axial movement of the front nut 160 relative to the flexible duct 130. Thus, the front nut 160 can rotate relative to the flexible duct 130 and can move axially relative to the flexible duct 130 between the limits imposed by the rearward shoulder portion 148 and the forward retaining portion 149.

As shown in FIGS. 3-8, the connector body 120 is an elongate member with the inner bore 129 for receiving the multi-fiber cable 190 and in which individual fibers 192 of the multi-fiber cable 190 are broken out from the multi-fiber cable 190. The connector body 120 may be formed of any known material, such as, for example, polymers, metals, or composite materials, having sufficient rigidity so that the connector body 120 does not readily bend or flex.

Conversely, the flexible duct 130 may be made of a material that is sufficiently flexible so that the flexible duct 130 easily bends and flexes. Thus, flexible duct 130 can flex from a first position (FIGS. 3 and 4), in which the connector body 120, the flexible duct 130, the front nut 160, and the port 199 of the fiber node 198 are aligned along a longitudinal axis X of the connector body 120, to a second position (FIGS. 5-8), in which the longitudinal axis X of the connector body 120 is disposed substantially perpendicular to an axis X' of front nut 160 and the port 199 of the fiber node 198 and the flexible duct 130 is curved from the front nut 160 to the connector body 120. It should be understood that the flexible duct 130 may bend and flex so that the axis X' of the front nut 160 forms any one of a variety of angles relative to the longitudinal axis X of connector body 120. In some aspects, the flexible duct 130 may bend and flex so that it assumes an S-shape or a C-shape, for example. The flexible duct 130 may bend and flex relative to the connector body 120 and the front nut 160.

Figure 3:
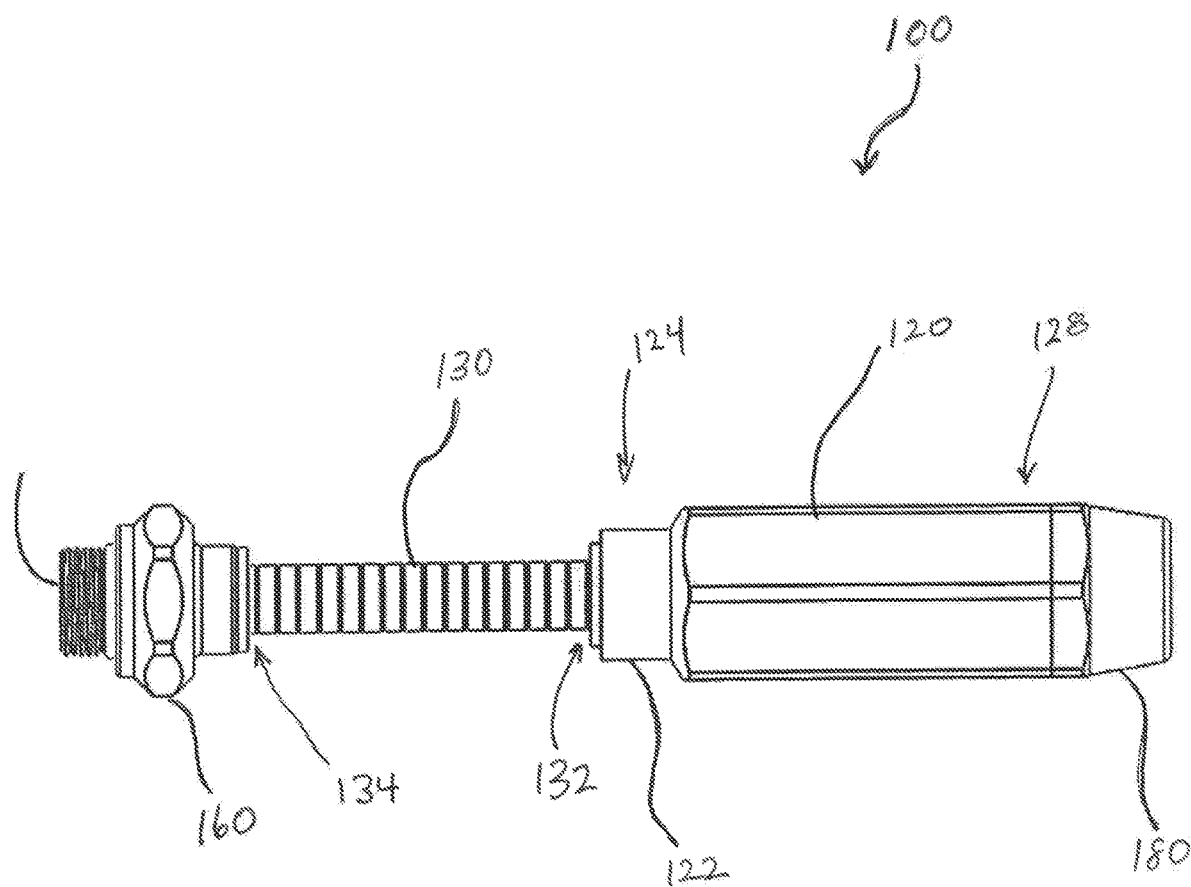
FIG. 3 is a diagrammatic illustration of an exemplary connector in accordance with various aspects of the disclosure.
Figure 4:
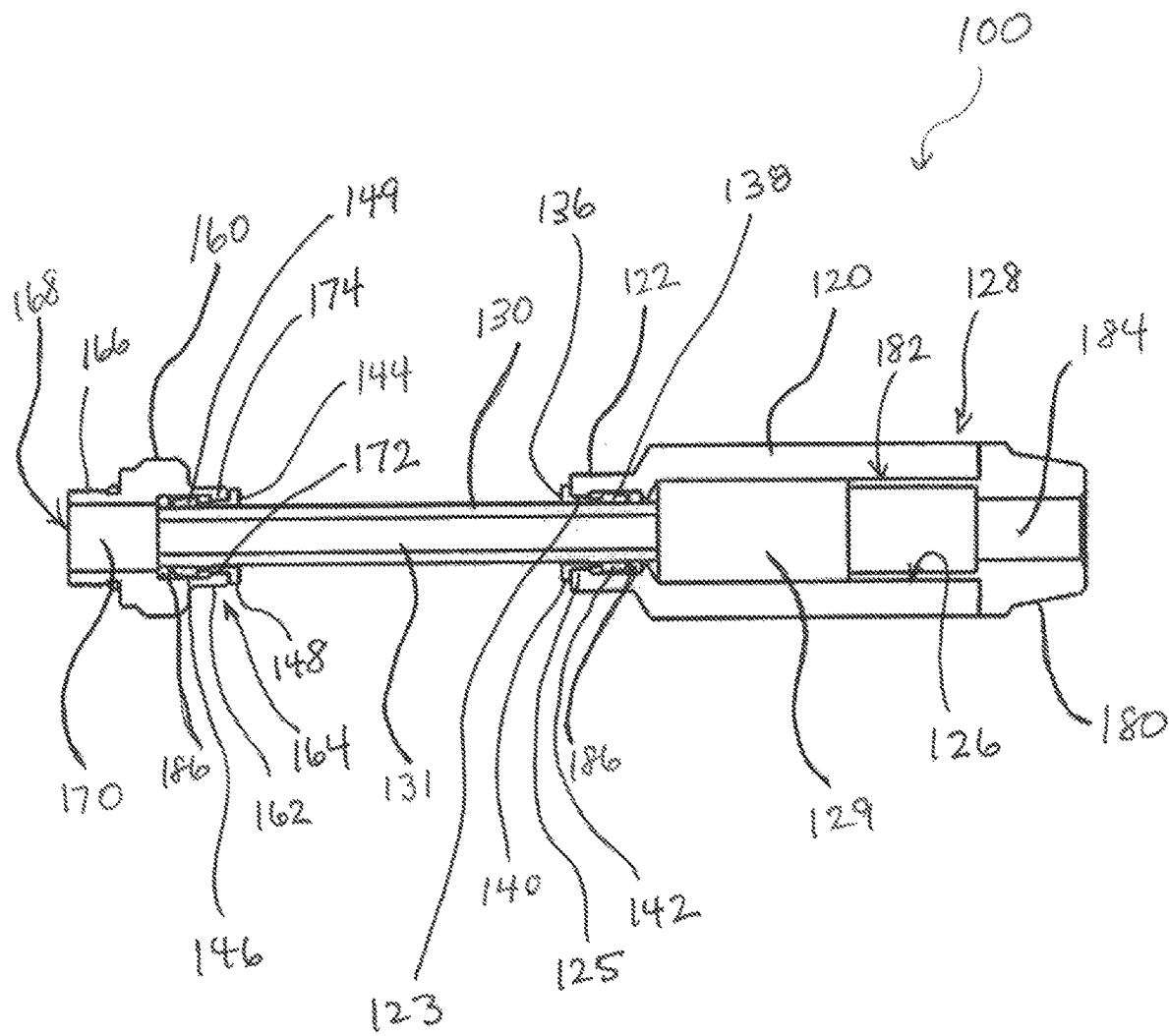
FIG. 4 is a cross-sectional view of the exemplary connector of FIG. 3.
Figure 5:
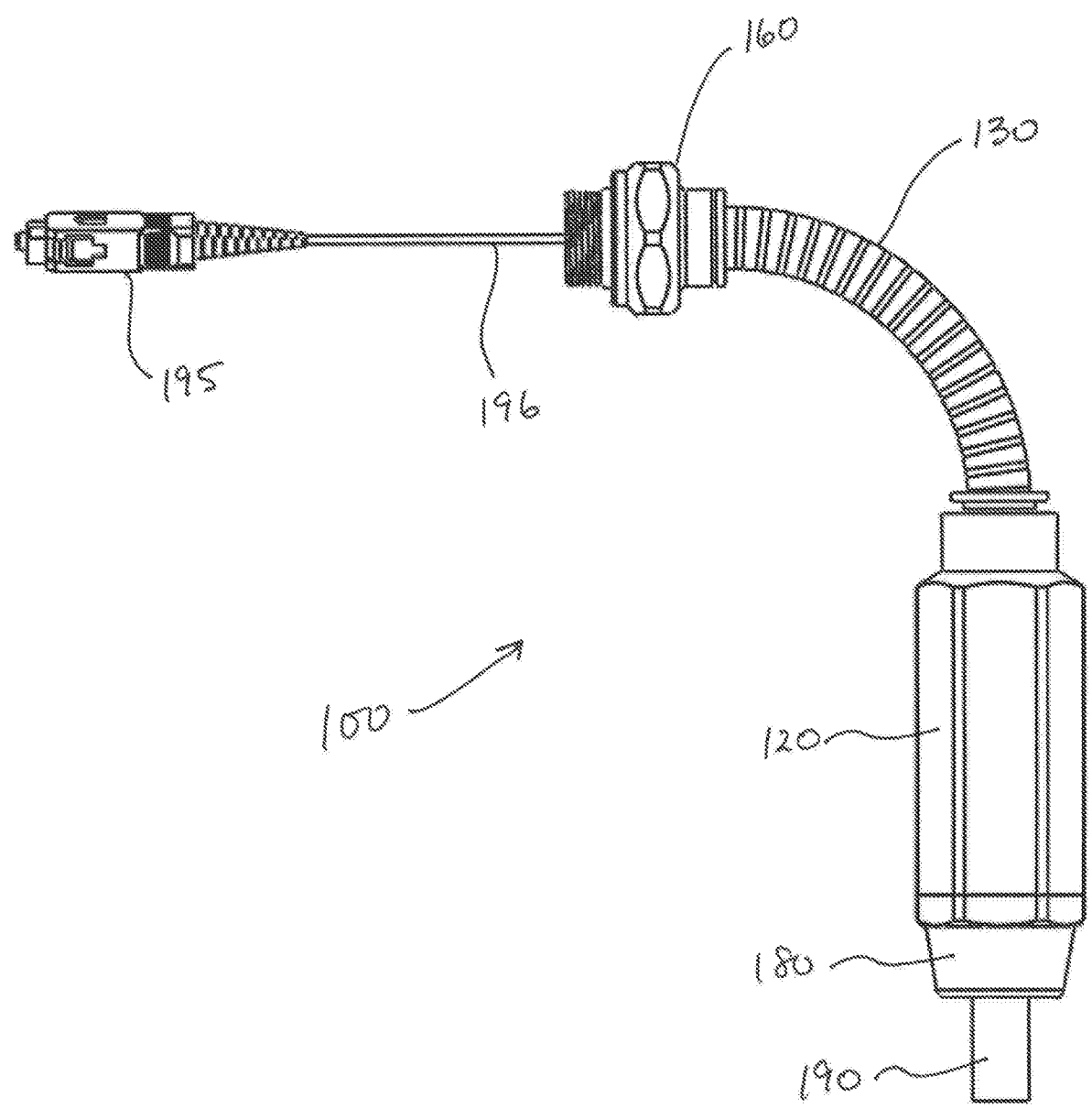
FIG. 5 is a diagrammatic illustration of the exemplary connector of FIG. 3 attached to a fiber node.
Figure 7:
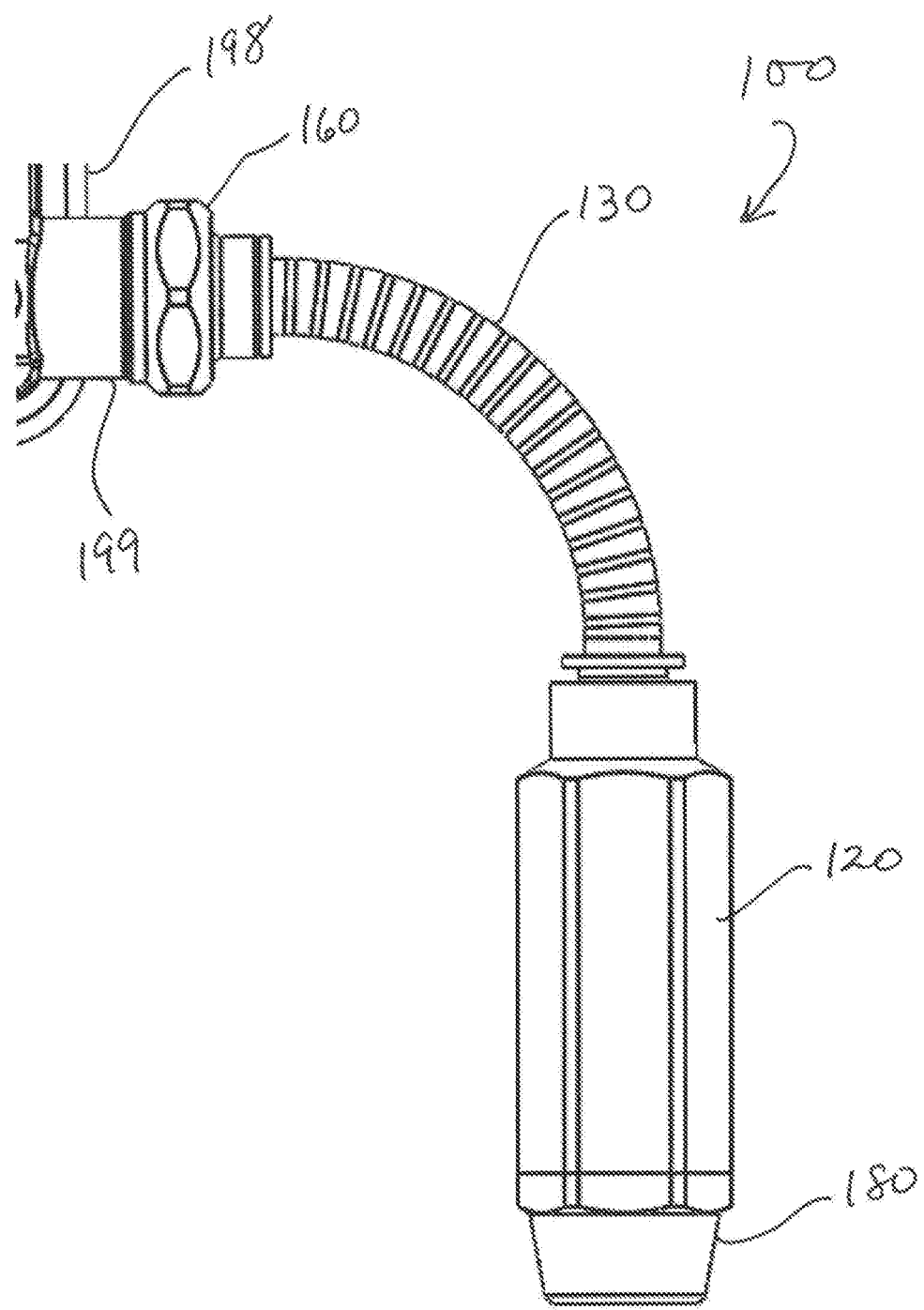
FIG. 7 is a diagrammatic illustration of the exemplary connector of FIG. 3 attached to a multi-fiber cable.

Furthermore, in some aspects, the flexible duct 130 may be comprised of a material that is sufficiently resilient so that the flexible duct 130 maintains a desired position after it has been bent/flexed into the desired position. For example, after the flexible duct 130 bends and flexes from the first position to the second position, the flexible duct 130 is maintained in the second position until a user again manipulates the flexible duct 130 by bending/flexing the flexible duct 130 to a third position. The flexible duct 130 may be comprised of any well know plastic material, such as, for example, polypropylene carbonate (PPC), polyethylene carbonate (PEC), or other suitable polymers. Additionally, as shown in FIGS. 3, 5, and 7, an outer surface of the flexible duct 130 may include segmented portions, which allow the flexible duct 130 to bend and flex relative to the connector body 120.

The rear nut 180 includes a through bore 184 extending coaxially with the inner bore 129 of the connector body 120. The through bore 184 is structured and arranged to retain and secure the multi-fiber cable 190 relative to the connector 100. In some embodiments, connector 100 may include a retaining feature, such as an epoxy material or a mechanical retaining feature (e.g, an inner sleeve), to retain the multi-fiber cable 190 within the connector body 120 and/or the rear nut 180. Thus, for example, the epoxy material may secure the cable within the connector body 120 and/or the rear nut 180.

The first and second duct fittings 136, 155 may include one or more seals 186, for example, O-rings, may be disposed between an outer surface of the flexible duct 130 and an inner surface of the connector body 120 and the front nut 160, respectively, to provide an environmental seal that prevents foreign matter from entering an inside of the connector 100.

Figure 6:
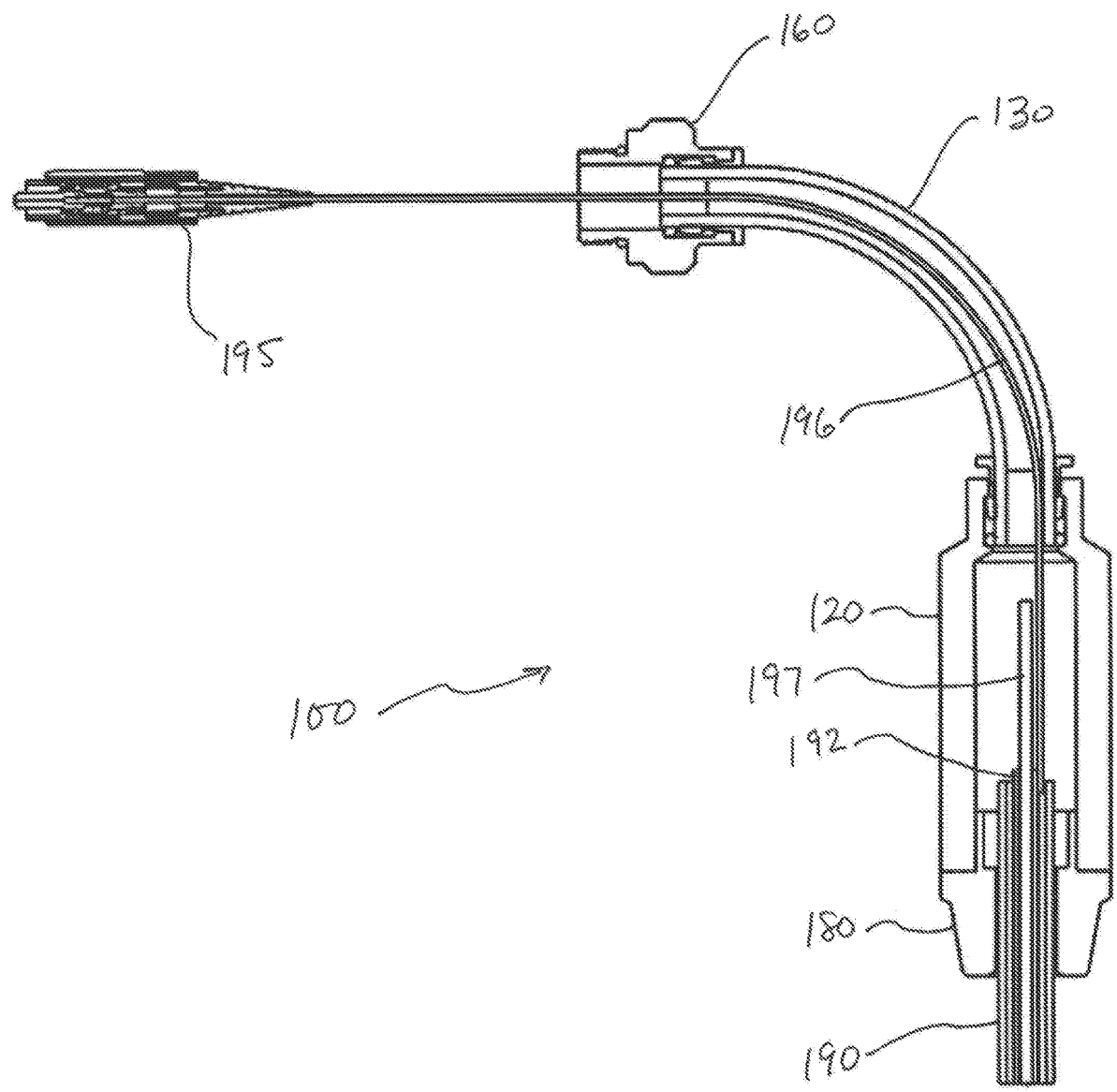
FIG. 6 is a cross-sectional view of the exemplary connector of FIG. 5.
Figure 8:
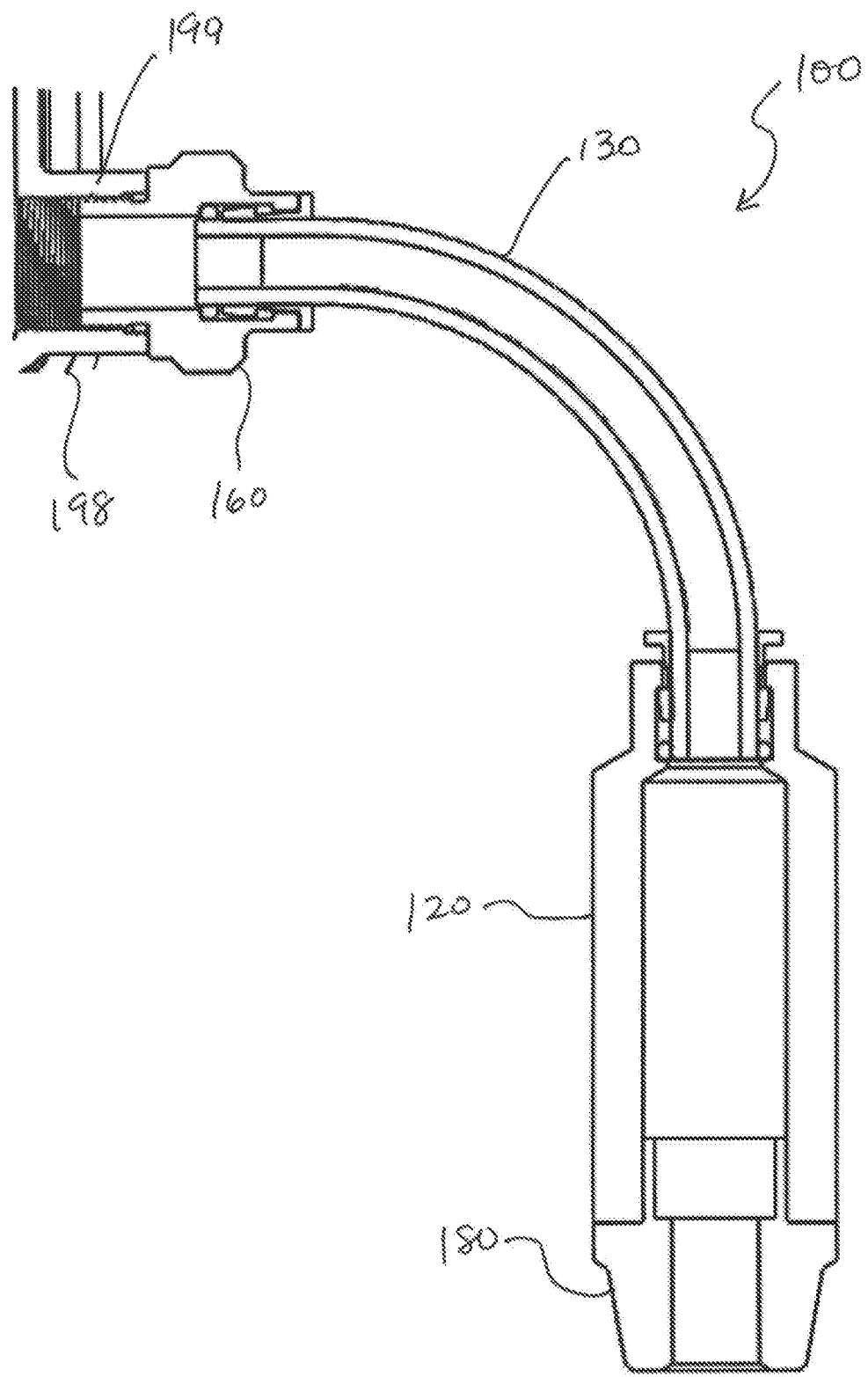
FIG. 8 is a cross-sectional view of the exemplary connector of FIG. 7.

As shown in FIG. 6, the multi-fiber cable 190 extends through the rear nut 180 and into the bore 129 of the connector body 120 where the individual cables 192 are broken out into breakout cables 196 that include the bare fibers (e.g., cladded fibers) each surrounded by a furcation tubing. The breakout cables 196 extend through the flexible duct 130 and through and out the front nut 160 where they are terminated with a fiber optic connector 195 such as, for example, an SC connector, an LC connector, an LC due connector, or the like. The bores 184, 129, 131, and 170 provide a continuous bore through the connector 100 through which the multi-fiber cable 190 and breakout cables 196 can pass. As shown in FIGS. 7 and 8, the threaded outer surface 166 at the forward end 168 of the front nut is structured and arranged for attachment to the internally threaded (i.e., female) port 199 of the fiber node 198.

As discussed above, the rearward end of the flexible duct 130 is attached to collar 122 of the connector body 120, and the forward end of the flexible duct 130 is attached to the front nut 160. Thus, the flexible duct 130 may be disposed within both the collar 122 of the connector body 120 and the front nut 160. The flexible duct 130 may be of sufficient length so that it axially overlaps with collar 122 by more than 0 inches and by less than or equal to 1.0 inch, and so that it axially overlaps with front nut by more than 0 inches and by less than or equal to 1.0 inch. Such an overlap allows the flexible duct 130 to be securely fastened to connector body 120 and the front nut. In some embodiments, the flexible duct 130 may axially overlap with the collar 122 by about 0.5 inches and may axially overlap with the front nut 160 by about 0.5 inches.

A user may easily grip the front nut 160 and the connector body 120 in order to bend and flex the flexible duct 130. Furthermore, the flexible duct 130 is rotatable relative to the front nut 160 and the connector body 120 due to the bearing relationship between the flexible duct 130 and the first and second duct fittings 136, 144. Thus, the bending and flexing of the flexible duct 130 may also cause front nut 160 to form a variety of angles relative to the connector body 120.

In one aspect, in order to attach the multi-fiber cable 190 with the connector 100, the multi-fiber cable 190 is introduced through the bore 184 of the rear nut 180 and into the bore 129 of the connector body 120. The cable 190 within may include an outer protective covering so that the cable is not easily bent and manipulated. The protective covering may be removed from an end of the cable so that the end of the cable is separated into multiple optical fiber strands. The separated optical fiber strands 192 of the cable 190 may be advanced through furcation tubing to form breakout cables 196 that extend through the bores 131, 170 of the flexible duct 130 and the front nut 160. Thus, the portion of the cable with the protective covering is disposed within the connector body 120 and the rear nut 180, while the separated optical fiber strands (with the protective covering removed) are disposed in the flexible duct 130 and the front nut 160. Because the protective covering is removed from the optical fiber strands, the breakout cables 196 are able to easily bend and flex with the flexing of the flexible duct 130. This allows the breakout cables 196 to be connected to the fiber node 198 at multiple angles.

The front nut 160 is configured to be connected to the port 199 of the fiber node 198 so that the flexible duct 130, the breakout cables 196, and the multi-fiber cable 192 may be connected to the fiber node 198 at any desired position. That is, if the port 199 on the fiber node 198 is arranged horizontally, the flexible duct 130 can bend downward under the force of gravity. Similarly, if the port 199 on the fiber node 198 is arranged upward in a vertical direction, the flexible duct 130 may bend downward under the force of gravity. Because the flexible duct 130 is rotatable relative to the front nut 160 and the connector body 120, the connector 100 can be connected to the port 199 of the node 198 in a manner that prevents bending or kinking of the breakout cables 196 and the fibers 192, which could result in damage to the cables and loss of optical signal. Further, the flexible duct 130 prevents the breakout cables 196 and the fibers 192 from bending at too sharp of an angle, which could otherwise result in damage to the cables and loss of optical signal.

Connector 100 also allows the multiple optical fiber strands to be easily advanced through connector 100 while connector 100 is, for example, in a straight configuration. Once the multiple optical fiber strands are sufficiently advanced within connector 100, a user may then bend the flexible duct 130 into any desired position. For example, a user may bend the flexible duct 130 so that it forms a right angled elbow. Such allows connector 100 to form a right angled elbow after the installation of the optical fiber strands within connector 100.

In some embodiments, the cable 190 is secured within the rear nut 180 or the connector body 120 with an epoxy. However, in other embodiments, the cable 190 is secured within the rear nut 180 or the connector body 120 without the use of epoxy. Additionally, connector 100 may provide a connector that is completely sealed from the outside environment.

When installing the cable within connector 100, the flexible duct 130 may be bent and manipulated into a particular configuration. Thus, the flexible duct 130 may be bent and manipulated so that front nut 160 aligns with the angle of the fiber node. Such may allow for easier installation of the cable with a fiber node, especially during field installation.

The bending and flexing capabilities of the flexible duct 130 may also allow the cable within the flexible duct 130 to bend and flex with the flexible duct 130. Such may prevent and/or reduce damage to the optical fibers. Because connector 100 allows the cable to bend with the flexible duct 130, the cable does not kink within connector 100. Therefore, the bending and flexing of the flexible duct 130 helps to prevent loss of optical signal, which may arise in a fiber optic cable when the cable becomes kinked.

The flexible duct 130 may also advantageously prevent twisting of the fibers 192 and breakout cables 196 (wires with the protective covering removed) that are held within connector 100. More specifically, the flexible duct 130 may compactly hold several optical fiber wires within a grouping so that the wires do not become twisted or tangled. Therefore, the fibers 192 and breakout cables 196 within connector body 120 also do not become twisted or tangled.

In some embodiments, a fixing member may attach to connector 100 in order to hold the flexible duct 130 in a fixed position. For example, the fixing member may hold the flexible duct 130 in a fixed 90 degree angle with regard to the longitudinal axis of connector body 120. The fixing member may attach to the flexible duct 130, to the connector body, and/or to front nut 160.

In some embodiments, connector 10 may be disposed within a pedestal for connection to the fiber node.

It will be apparent to those skilled in the art that various modifications and variations can be made to the connector of the present disclosure. Other embodiments of the connector will be apparent to those skilled in the art from consideration of the specification and practice of the method disclosed herein.

What is claimed is:

1. A fiber node connector comprising:
   a flexible duct having a first end and a second end, and having a first through bore extending from the first end to the second end;
   a nut having a second through bore, the nut being configured to be coupled with a port of a fiber node;
   a connector body coupled with the second end of the flexible duct and having a third through bore;
   a first duct fitting attached to an outer surface at a first end of the flexible duct such that the first duct fitting is axially and rotatably fixed to the flexible duct, the first duct fitting having a collar portion and two retaining portions spaced apart in an axial direction of the flexible duct and extending outward from the collar portion; and
   a second duct fitting attached to an outer surface at a second end of the flexible duct such that the second duct fitting is axially and rotatably fixed to the flexible duct, the second duct fitting having a collar portion and two retaining portions spaced apart in an axial direction of the flexible duct and extending outward from the collar portion of the second duct fitting,
   wherein the nut includes an inward lip configured to be received between the two retaining portions of the first duct fitting to couple the nut with the first end of the flexible duct, the two retaining portions of the first duct fitting being configured to permit the nut to rotate relative to the flexible duct and to permit limited relative axial movement between the nut and the flexible duct,
   wherein the connector body includes an inward lip configured to be received between the two retaining portions of the second duct fitting to couple the connector body with the second end of the flexible duct, the two retaining portions of the second duct fitting being configured to permit the connector body to rotate relative to the flexible duct and to permit limited relative axial movement between the connector body and the flexible duct,
   wherein the first, second, and third through bores provide a continuous bore through the connector, and
   wherein the connector body is configured to receive a fiber optic cable, and the first, second, and third through bores permit a fiber of the fiber optic cable to pass through the flexible duct and the nut and out of the nut for coupling with a fiber optic connection at the fiber node.

2. A fiber optic assembly comprising:
   the fiber node connector of claim 1; and
   a fiber optic cable,
   wherein the fiber optic cable is securely coupled with the connector body, and a fiber of the fiber optic cable passes through the connector body, the flexible duct, and the nut and extends out of the nut, the fiber being terminated by a fiber optic connector exterior of the fiber node connector.

3. A fiber optic assembly comprising:
   the fiber node connector of claim 1; and
   a multi-fiber cable,
   wherein the multi-fiber cable is securely coupled with the connector body, and a plurality of fibers of the fiber optic cable pass through the connector body, the flexible duct, and the nut and extend out of the nut, each of the plurality of fibers being terminated by a respective fiber optic connector exterior of the fiber node connector.

4. The fiber node connector of claim 1, wherein the flexible duct is configured to move from a first position, such that the flexible duct is parallel with a longitudinal axis of the connector body, to a second position, such that the flexible duct is perpendicular to the longitudinal axis of the connector body.

5. A fiber node connector comprising:
   a flexible duct having a first end and a second end, and having a first through bore extending from the first end to the second end;
   a nut having a second through bore, the nut being configured to be coupled with a port of a fiber node; and
   a connector body coupled with the second end of the flexible duct and having a third through bore,
   wherein the nut is coupled with the first end of the flexible duct by a first duct fitting, the first duct fitting being axially and rotatably fixed to the flexible duct, the first duct fitting being configured to permit the nut to rotate relative to the flexible duct and to permit limited relative axial movement between the nut and the flexible duct,
   wherein the connector body is coupled with the second end of the flexible duct by a second duct fitting, the second duct fitting being axially and rotatably fixed to the flexible duct, the second duct fitting being configured to permit the connector body to rotate relative to the flexible duct and to permit limited relative axial movement between the connector body and the flexible duct,
   wherein the first, second, and third through bores provide a continuous bore through the connector, and
   wherein the connector body is configured to receive a fiber optic cable, and the first, second, and third through bores permit a fiber of the fiber optic cable to pass through the flexible duct and the nut and out of the nut for coupling with a fiber optic connection at the fiber node.

6. The fiber node connector of claim 5, wherein the first duct fitting has a collar portion and two retaining portions spaced apart in an axial direction of the flexible duct and extending outward from the collar portion, and wherein the nut includes an inward lip configured to be received between the two retaining portions to couple the nut with the first end of the flexible duct, the two retaining portions being configured to permit the nut to rotate relative to the flexible duct and to permit limited relative axial movement between the nut and the flexible duct.

7. The fiber node connector of claim 6, wherein the second duct fitting has a collar portion and two retaining portions spaced apart in an axial direction of the flexible duct and extending outward from the collar portion, and wherein the connector body includes an inward lip configured to be received between the two retaining portions of the second duct fitting to couple the connector body with the second end of the flexible duct, the two retaining portions of the second duct fitting being configured to permit the connector body to rotate relative to the flexible duct and to permit limited relative axial movement between the connector body and the flexible duct.

8. The fiber node connector of claim 5, wherein the second duct fitting has a collar portion and two retaining portions spaced apart in an axial direction of the flexible duct and extending outward from the collar portion, and wherein the connector body includes an inward lip configured to be received between the two retaining portions to couple the connector body with the second end of the flexible duct, the two retaining portions being configured to permit the connector body to rotate relative to the flexible duct and to permit limited relative axial movement between the connector body and the flexible duct.

9. A fiber optic assembly comprising:
the fiber node connector of claim 5; and
a fiber optic cable,
wherein the fiber optic cable is securely coupled with the connector body, and a fiber of the fiber optic cable passes through the connector body, the flexible duct, and the nut and extends out of the nut, the fiber being terminated by a fiber optic connector exterior of the fiber node connector.

10. A fiber optic assembly comprising:
the fiber node connector of claim 5; and
a multi-fiber cable,
wherein the multi-fiber cable is securely coupled with the connector body, and a plurality of fibers of the fiber optic cable pass through the connector body, the flexible duct, and the nut and extend out of the nut, each of the plurality of fibers being terminated by a respective fiber optic connector exterior of the fiber node connector.

11. The fiber node connector of claim 5, wherein the flexible duct is configured to move from a first position, such that the flexible duct is parallel with a longitudinal axis of the connector body, to a second position, such that the flexible duct is perpendicular to the longitudinal axis of the connector body.

12. A fiber node connector comprising:
a flexible duct having a first end and a second end, and having a first through bore extending from the first end to the second end;
a nut having a second through bore, the nut being configured to be coupled with a port of a fiber node; and
a connector body coupled with the second end of the flexible duct and having a third through bore,
wherein the nut is coupled with the first end of the flexible duct by a first duct fitting, the first duct fitting being axially and rotatably fixed to the flexible duct, the first duct fitting being configured to permit the nut to rotate relative to the flexible duct and to permit limited relative axial movement between the nut and the flexible duct, wherein the connector body is coupled with the second end of the flexible duct by a second duct fitting, the second duct fitting being axially and rotatably fixed to the flexible duct, the second duct fitting being configured to permit the connector body to rotate relative to the flexible duct and to permit limited relative axial movement between the connector body and the flexible duct, and wherein the first, second, and third through bores provide a continuous bore through the connector.

13. The fiber node connector of claim 12, wherein the first duct fitting has a collar portion and two retaining portions spaced apart in an axial direction of the flexible duct and extending outward from the collar portion, and wherein the nut includes an inward lip configured to be received between the two retaining portions to couple the nut with the first end of the flexible duct, the two retaining portions being configured to permit the nut to rotate relative to the flexible duct and to permit limited relative axial movement between the nut and the flexible duct.

14. The fiber node connector of claim 13, wherein the second duct fitting has a collar portion and two retaining portions spaced apart in an axial direction of the flexible duct and extending outward from the collar portion, and wherein the connector body includes an inward lip configured to be received between the two retaining portions of the second duct fitting to couple the connector body with the second end of the flexible duct, the two retaining portions of the second duct fitting being configured to permit the connector body to rotate relative to the flexible duct and to permit limited relative axial movement between the connector body and the flexible duct.

15. The fiber node connector of claim 12, wherein the second duct fitting has a collar portion and two retaining portions spaced apart in an axial direction of the flexible duct and extending outward from the collar portion, and wherein the connector body includes an inward lip configured to be received between the two retaining portions to couple the connector body with the second end of the flexible duct, the two retaining portions being configured to permit the connector body to rotate relative to the flexible duct and to permit limited relative axial movement between the connector body and the flexible duct.

16. A fiber optic assembly comprising:
the fiber node connector of claim 12; and
a fiber optic cable,
wherein the fiber optic cable is securely coupled with the connector body, and a fiber of the fiber optic cable passes through the connector body, the flexible duct, and the nut and extends out of the nut, the fiber being terminated by a fiber optic connector exterior of the fiber node connector.

17. A fiber optic assembly comprising:
the fiber node connector of claim 12; and
a multi-fiber cable,
wherein the multi-fiber cable is securely coupled with the connector body, and a plurality of fibers of the fiber optic cable pass through the connector body, the flexible duct, and the nut and extend out of the nut, each of the plurality of fibers being terminated by a respective fiber optic connector exterior of the fiber node connector.

18. The fiber node connector of claim 12, wherein the flexible duct is configured to move from a first position, such that the flexible duct is parallel with a longitudinal axis of the connector body, to a second position, such that the flexible duct is perpendicular to the longitudinal axis of the connector body.

\* \* \* \* \*